(12) United States Patent
Tanaka et al.

(10) Patent No.: US 7,486,203 B2
(45) Date of Patent: Feb. 3, 2009

(54) PARKING ASSIST APPARATUS FOR VEHICLE

(75) Inventors: Yuu Tanaka, Aichi-ken (JP); Tomohiko Endo, Toyota (JP); Hideyuki Iwakiri, Tajimi (JP); Toru Sugiyama, Toyota (JP); Yoichi Iwata, Aichi-ken (JP); Hisashi Satonaka, Susono (JP); Takuya Itoh, Kuwana (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 96 days.

(21) Appl. No.: 11/115,306

(22) Filed: Apr. 27, 2005

(65) Prior Publication Data

US 2005/0264432 A1 Dec. 1, 2005

(30) Foreign Application Priority Data

Apr. 27, 2004 (JP) ............................. 2004-131919

(51) Int. Cl.
*B60Q 1/48* (2006.01)
*G08G 1/14* (2006.01)

(52) U.S. Cl. ................... 340/932.2; 340/435; 340/436; 340/437; 701/41; 701/44; 701/301

(58) Field of Classification Search ......... 340/435–437, 340/932.2; 701/41, 44, 301
See application file for complete search history.

(56) References Cited

U.S. PATENT DOCUMENTS

| | | | |
|---|---|---|---|
| 5,742,141 A | 4/1998 | Czekaj | |
| 6,170,591 B1* | 1/2001 | Sakai et al. | 180/204 |
| 6,212,452 B1 | 4/2001 | Shimizu et al. | |
| 6,483,442 B2 | 11/2002 | Shimizu et al. | |
| 6,898,527 B2 | 5/2005 | Kimura et al. | |
| 6,950,035 B2 | 9/2005 | Tanaka et al. | |
| 2002/0041239 A1* | 4/2002 | Shimizu et al. | 340/932.2 |
| 2002/0198634 A1* | 12/2002 | Shimazaki et al. | 701/1 |
| 2003/0080877 A1* | 5/2003 | Takagi et al. | 340/932.2 |
| 2004/0119610 A1* | 6/2004 | Maemura et al. | 340/932.2 |

FOREIGN PATENT DOCUMENTS

| | | |
|---|---|---|
| DE | 4425419 C1 | 12/1995 |
| DE | 10220427 A1 | 11/2003 |
| EP | 1148461 A2 | 10/2001 |
| EP | 1270367 A2 | 1/2003 |

(Continued)

OTHER PUBLICATIONS

Japanese Laid-Open Patent No. 2002-240661.

(Continued)

*Primary Examiner*—George A Bugg
*Assistant Examiner*—Samuel J Walk
(74) *Attorney, Agent, or Firm*—Sughrue Mion, PLLC

(57) ABSTRACT

A parking assist apparatus for a vehicle includes a recognizing apparatus for recognizing a target position for parking the vehicle, a calculating apparatus for calculating a course for parking the vehicle from a current vehicle position to the target position recognized by the recognizing apparatus during the vehicle being moving and an informing apparatus for informing a user of the vehicle that the vehicle can be parked at the recognized target position when the course of the vehicle has been correctly calculated by the calculating apparatus.

9 Claims, 5 Drawing Sheets

FOREIGN PATENT DOCUMENTS

| | | |
|---|---|---|
| EP | 1297999 A2 | 4/2003 |
| EP | 1 403 138 A1 | 9/2003 |
| FR | 2785383 | 10/1998 |
| JP | 11-157404 A | 6/1999 |
| JP | 2001-322519 A | 11/2001 |
| JP | 2002-036991 A | 2/2002 |
| JP | 2003-054437 A | 2/2003 |
| JP | 2003-300443 A | 10/2003 |
| JP | 2004-009791 A | 1/2004 |
| JP | 2004-114977 A | 4/2004 |

OTHER PUBLICATIONS

Japanese Office Action (with English translation) dated May 20, 2008.

Das Volkswagen-Forschungsauto "IRVW-Futura, Teil 1, in,, ATZ Automobiltechnische Zeitschnft" 91 (1989), Seiten 462-432.

* cited by examiner

PARKING ASSIST APPARATUS FOR VEHICLE

CROSS REFERENCE TO RELATED APPLICATIONS

This application is based on and claims priority under 35 U.S.C. § 119 to Japanese Patent Application 2004-131919, filed on Apr. 27, 2004, the entire content of which is incorporated herein by reference.

FIELD OF THE INVENTION

The present invention generally relates to a parking assist apparatus. More particularly, the present invention pertains to a parking assist apparatus for performing a parking assist control in order to guide the vehicle to a target position for parking the vehicle or a parking starting position of the vehicle.

BACKGROUND

Conventionally, as described in JP2002-240661A, a parking assist apparatus for a vehicle is known which calculates a course to a target position for parking the vehicle on the basis of a positional relation between a current vehicle position and the target position when a shift lever of the vehicle is set to a back position, and displays the calculation result on a monitor.

However, according to JP2002-240661A described above, the course to the target position is calculated when the shift lever is set to the back position. As a result, if it is found that the vehicle can not be parked at the target position when the shift lever is set to the back position, the target position or the vehicle position need to be changed. Accordingly, extra time is required to complete parking the vehicle, which increases a burden on a user of the vehicle.

A need thus exists for a parking assist apparatus which enables a vehicle to be parked at a target position for parking the vehicle in a shorter time, which increases a level of convenience for a user. The present invention has been made in view of the above circumstances and provides such a parking assist apparatus.

SUMMARY OF THE INVENTION

According to an aspect of the present invention, a parking assist apparatus for a vehicle includes a recognizing means for recognizing a target position for parking the vehicle, a calculating means for calculating a course for parking the vehicle from a current vehicle position to the target position recognized by the recognizing means during the vehicle being moving and an informing means for informing a user of the vehicle that the vehicle can be parked at the recognized target position when the course for parking the vehicle has been calculated by the calculating means.

According to a further aspect of the present invention, a parking assist apparatus for a vehicle includes a vehicle speed-detecting means for detecting a vehicle speed, a steering angle-detecting means for detecting a steering angle of the vehicle, a recognizing means for recognizing a target position for parking the vehicle, a calculating means for calculating a current vehicle position on the basis of information collected from the vehicle speed-detecting means and the steering angle-detecting means, and calculating a course for parking the vehicle on the basis of the calculated current vehicle position and the target position recognized by the recognizing means, during the vehicle being moving, and an informing means for informing a user of the vehicle that the vehicle can be parked at the recognized target position when the course for parking the vehicle has been calculated by the calculating means.

According to a further aspect of the present invention, a parking assist apparatus for a vehicle includes a recognizing means for recognizing a target position for parking the vehicle, a calculating means for calculating a parking starting position suitable for parking the vehicle at the target position for parking the vehicle recognized by the recognizing means, and an assistance means for guiding the vehicle to the parking starting position.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

First Embodiment

A first embodiment of the present invention will be explained with reference to drawing figures.

Figure 1:
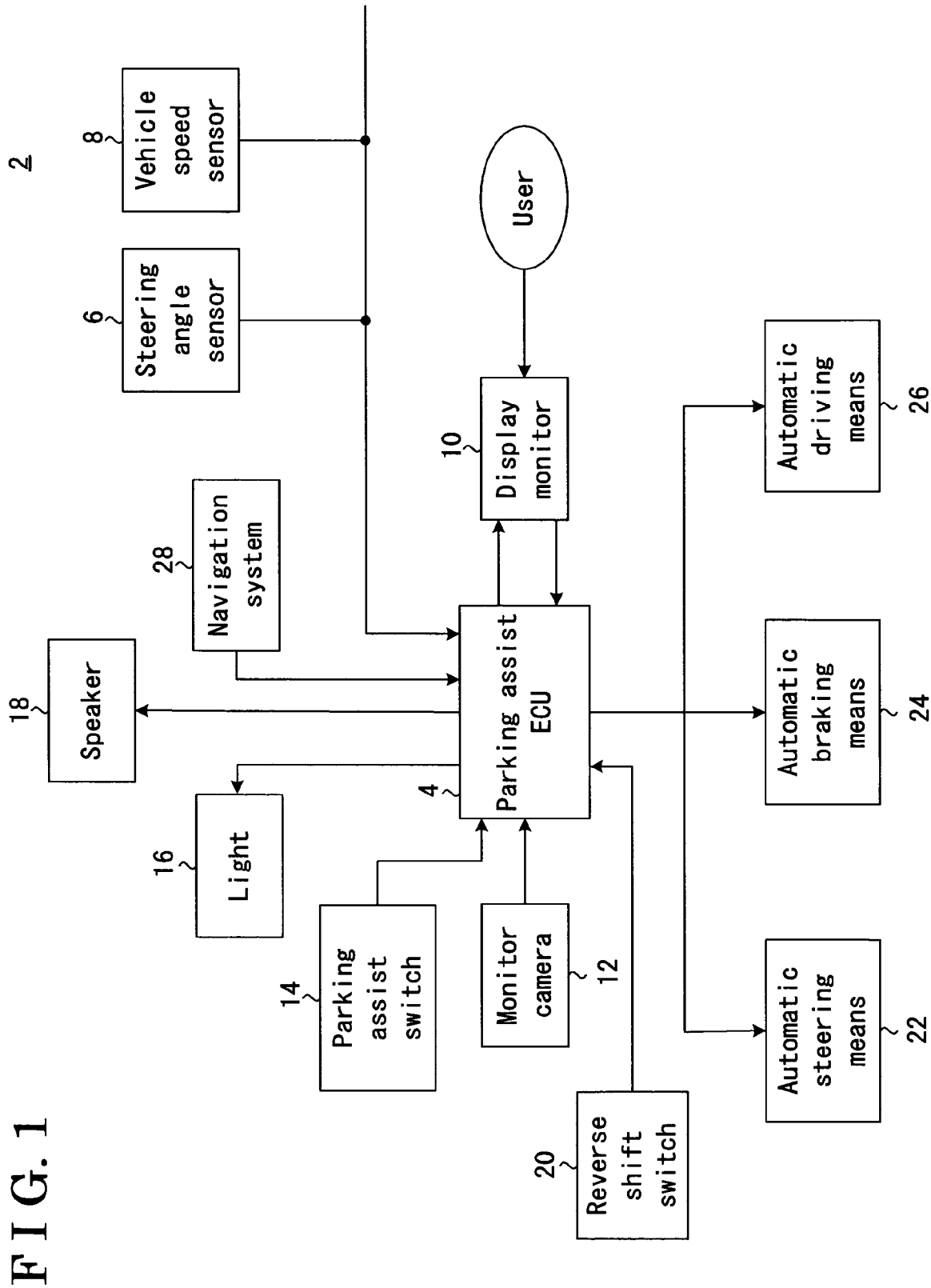
FIG. 1 represents a schematic diagram illustrating a parking assist apparatus for a vehicle according to first to third embodiments of the present invention.

FIG. 1 illustrates a schematic diagram of a parking assist apparatus according to a first to third embodiments of the present invention. As illustrated in FIG. 1, a parking assist apparatus 2 according to the embodiment is mainly configured of an electronic control unit (hereinafter referred to as a parking assist ECU) 4. The parking assist ECU 4 is a microcomputer including a Central Processing Unit (CPU), a Read Only Memory (ROM), a Random Access Memory (RAM), and an interface circuit, or the like, devices which are connected mutually through buses. A control program for operating the CPU is stored in the ROM, A steering angle sensor 6 for detecting a steering angle of a steering wheel through a bus, and a vehicle speed sensor 8 for detecting a vehicle speed, are connected to the parking assist ECU 4. As the vehicle speed sensor 8, a magnetic or optical encoder provided at a shaft of a wheel, or the like, can be utilized. The vehicle speed sensor 8 generates pulsed signals at a period corresponding to a rotational speed of the wheel. A reverse shift switch 20 and a parking assist switch 14 are connected to the parking assist ECU 4. The reverse shift switch 20 transmits an on-signal to the parking assist ECU 4 on occasion where a transmission lever is set to a back position. The parking assist ECU 4 judges, on the basis of an output signal of the reverse shift switch 20, whether or not the vehicle is in a condition of moving backward. The parking assist switch 14 is provided in a vehicle compartment. The parking assist switch 14 transmits an on-signal on the basis of an operation of the switch performed by a user. The parking assist switch 14 can be provided at a touch switch of a display monitor 10 (which will be explained later).

An informing means, such as a speaker 18 and/or a light 16, for informing whether or not the vehicle can be parked at a target position for parking the vehicle, is connected to the parking assist ECU 4. When the parking assist ECU 4 judges that the vehicle can be parked at the target position, the parking assist ECU 4 supplies electricity to the speaker 18 and the light 16. When electricity is supplied to the speaker 18 and the light 16, the speaker 18 makes sounds (for performing acoustic guidance), and the light is turned on. On the basis of the sounds and lights, a user can judge whether or not the vehicle can be parked at the target position. The light 16 can be provided on the display monitor 10 (which will be explained later).

A monitor camera 12 provided at the back of the vehicle and a display monitor 10 provided in the vehicle compartment are connected to the parking assist ECU 4. Here, the monitor camera 12 is provided at the back of the vehicle. However, the position where the monitor camera 12 is provided is not limited. The monitor camera 12 can be provided at any position of the vehicle.

The monitor camera 12 is a Charge Coupled Device (CCD) camera for taking picture images of vehicle surroundings seen from the back of the vehicle and the side of the vehicle within a predetermined range of angle. The monitor camera 12 transmits the taken picture images to the parking assist ECU 4. The parking assist ECU 4 transmits the taken picture images transmitted from the monitor camera 12 to the display monitor 10. The display monitor 10 can display a touch switch for setting the target position for parking the vehicle. A user can set and adjust the target position via the touch switch for setting the target position. Specifically, on the basis of an operation of the touch switch displayed on the display monitor 10, the parking assist ECU 4 transmits a signal to the display monitor 10 for displaying layers of the following three, first, the picture images taken by and transmitted from the monitor camera 12, second, a frame indicating the target position for parking the vehicle, third, the touch switch for setting the target position.

The frame indicating the target position is visible, and its position and orientation can be visually recognized. Two kinds of the frame are prepared for being utilized in a situation of parking the vehicle in a garage, and in a situation of parking the vehicle in a parallel parking. When the vehicle reaches a parking starting position for parking the vehicle, or after the parking assist ECU 4 recognizes the target position, the frame is displayed on the display monitor 10. If a user moves and adjusts the frame as a required basis, the target position is moved and adjusted.

An automatic steering means 22 for steering the vehicle on the basis of a signal from the parking assist ECU 4, and an automatic braking means 24 for braking the vehicle on the basis of a signal from the parking assist ECU 4, are connected to the parking assist ECU 4 through buses. Further, an automatic driving means 26 for driving the vehicle on the basis of a signal from the parking assist ECU 4 is connected to the parking assist ECU 4 through buses.

Next, specific processes performed by the parking assist ECU 4 will be explained.

Figure 2:
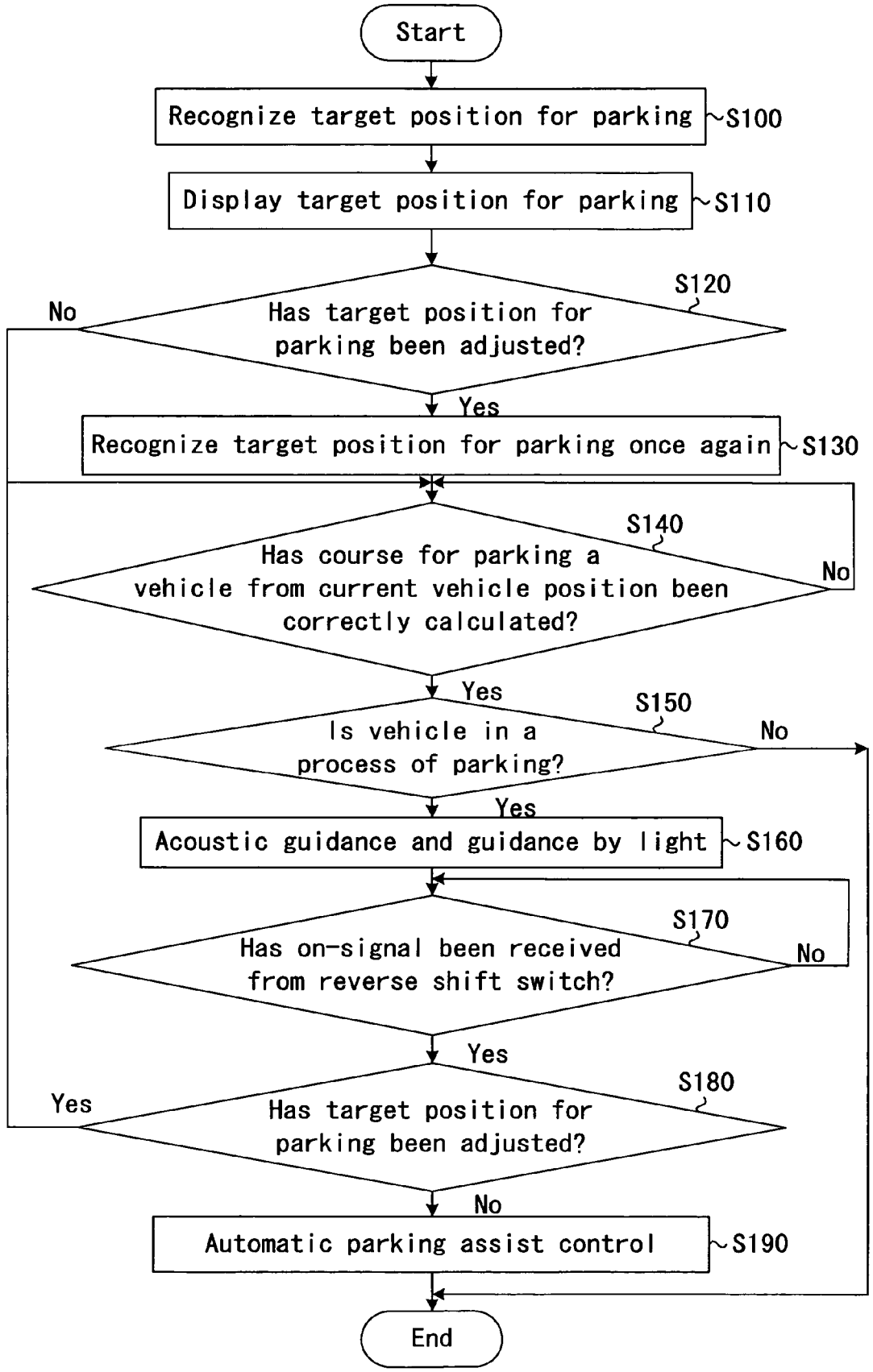
FIG. 2 represents a flow chart illustrating specific processes performed by a parking assist ECU of the parking assist apparatus according to a first embodiment of the present invention.
Figure 3A:
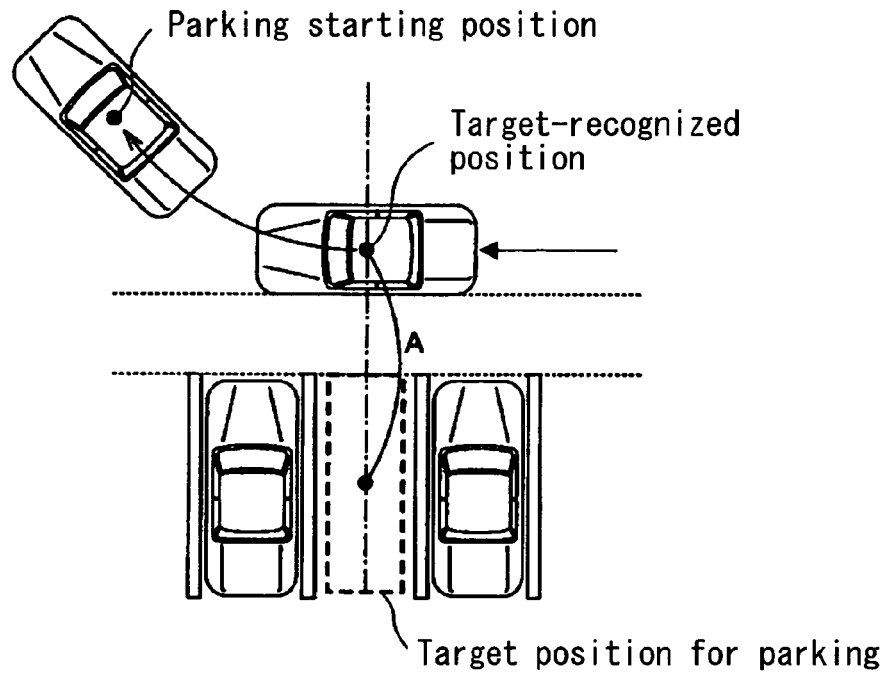
FIG. 3A represents a diagram illustrating situations of parking the vehicle in a garage parking according to the embodiment of the present invention.
Figure 3B:
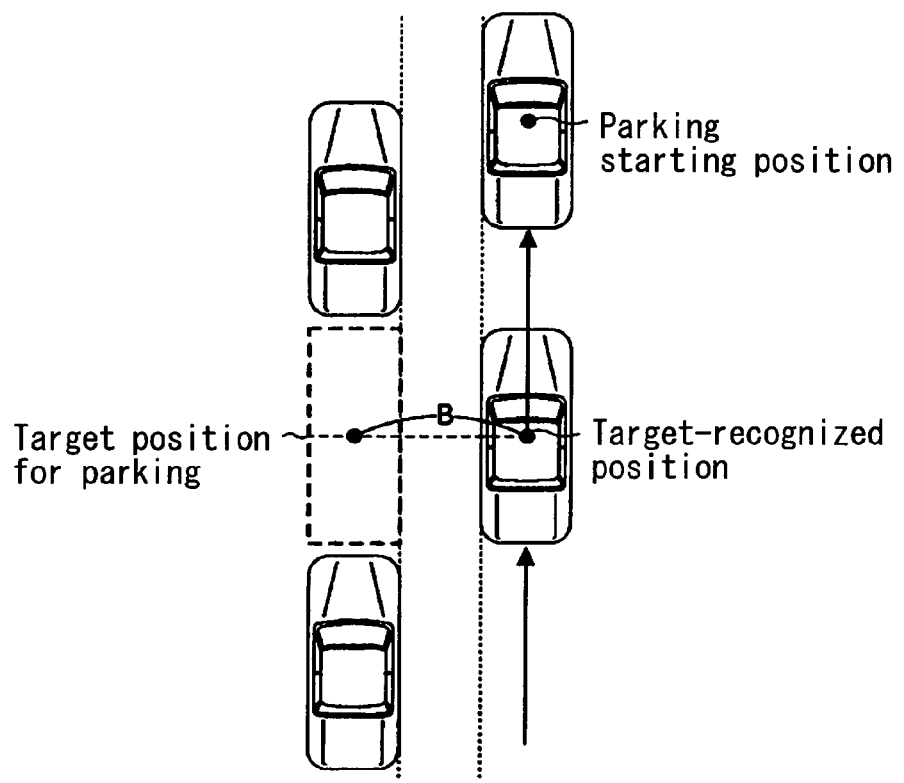
FIG. 3B represents a diagram illustrating situations of parking the vehicle in a parallel parking according to the embodiment of the present invention.

FIG. 2 illustrates a flow chart of specific processes which are performed by the parking assist ECU 4 of the parking assist apparatus according to the first embodiment. FIG. 3A represents a drawing illustrating a situation of parking the vehicle in a garage parking according to the embodiment, and FIG. 3B represents a drawing illustrating a situation of parking the vehicle in a parallel parking in a head-to-tail manner according to the embodiment.

As illustrated in FIG. 2, in a step 100 (S100), when the parking assist ECU 4 judges, on the basis of a vehicle speed detected by the vehicle speed sensor 8, that the vehicle is at a stop, the parking assist ECU 4 recognizes a predetermined relative position to the current vehicle position as the target position for parking the vehicle.

Specifically, in the case of parking the vehicle in a garage, when the parking assist ECU 4 judges that the vehicle is at a stop, the parking assist ECU 4 recognizes a position where the vehicle position is turned 90° around a center of the vehicle clockwise, and was moved backward by a distance A as the target position for parking the vehicle (FIG. 3A). Further, in the case of parallel parking, when the parking assist ECU 4 judges that the vehicle is at a stop, the parking assist ECU 4 recognizes a vehicle position where the vehicle was moved from the center of the vehicle in a transverse direction by a distance B as the target position for parking (FIG. 3B). Here, values of the distance A and the distance B described above are stored in advance in the ROM of the parking assist ECU 4.

Further, the parking assist ECU 4 recognizes a vehicle position at a time that the target position for parking the vehicle was recognized (hereinafter referred to as a target-recognized position) in terms of a two-dimensional coordinate system having an origin at the target position for parking the vehicle. After recognizing the target position, the parking assist ECU 4 proceeds to a process of a step 110.

In the step 110, the parking assist ECU 4 displays a picture image, taken by and transmitted from the monitor camera 12, on the display monitor 10. Further, the parking assist ECU 4 displays the recognized target position over the taken picture. After that, the parking assist ECU 4 proceeds to a process of a step 120. Accordingly, a user can check in advance whether the target position for parking the vehicle recognized by the parking assist ECU 4 corresponds to a target position for parking the vehicle intended by a user.

In the step 120, the parking assist ECU 4 judges whether or not items of information regarding the target position are fed from the touch switch of the display monitor 10 for setting the target position, and the parking assist ECU 4 judges whether or not the target position was adjusted by a user. When the parking assist ECU 4 judges that the items of information regarding the target position are fed, and the target position was adjusted by a user, the parking assist ECU 4 recognizes once again a fed target position for parking the vehicle as the target position (step 130). On the other hand, when items of information regarding the target position are not fed, the parking assist ECU 4 judges that the target position was not adjusted by a user, and proceeds to a process of a step 140.

In the step 140, the parking assist ECU 4 calculates a current vehicle position on the basis of the target-recognized position, and on the basis of a vehicle speed detected by the vehicle speed sensor 8 and a steering angle from the steering angle sensor 6. Next, the parking assist ECU 4 calculates a course for parking the vehicle between the calculated current vehicle position and the target position for parking the vehicle described above when the vehicle is moving. In addition, the parking assist ECU 4 calculates the course for parking the vehicle from a position where the target position is recognized (target-recognized position) by every predetermined small moving distance. In addition, the parking assist ECU 4 calculates the course for parking the vehicle so as to satisfy a restricting condition such as a maximum steering angle and a vehicle speed. When the course for parking the vehicle was calculated on the basis of the restricting condition (when the course for parking the vehicle was correctly calculated), the parking assist ECU 4 proceeds to a process of a step 150. When the course for parking the vehicle can not be calculated, the parking assist ECU 4 keeps on waiting at a step 140 until the course for parking the vehicle is calculated.

In the step 150, the parking assist ECU 4 judges whether or not the vehicle is in a process of parking the vehicle. Specifically, the parking assist ECU 4 judges whether or not the vehicle is in a process of parking the vehicle on the basis of a moving condition of the vehicle after the parking assist ECU 4 recognizes the target position for parking the vehicle described above. For example, when the steering angle detected by the steering angle sensor 6 is a predetermined value or more, when the vehicle speed detected by the vehicle speed sensor 8 is a predetermined value or less, and when a current vehicle position is within a predetermined distance from the target-recognized position, the parking assist ECU 4 judges that the vehicle is in a process of parking the vehicle. Further, the parking assist ECU 4 judges whether or not the vehicle is in a process of parking the vehicle, on the basis of a map data from a navigation system 28 and the on-signal from the parking assist switch 14 operable by a user. If the parking assist ECU 4 has received the on-signal from the parking assist switch 14, the parking assist ECU 4 judges that the vehicle is in a process of parking the vehicle. If the parking assist ECU 4 has not received the on-signal, the parking assist ECU 4 judges that the vehicle is not in a process of parking the vehicle. Predetermined values regarding the vehicle speed, the steering angle, and the distance from the target-recognized position described above are stored in advance in the ROM of the parking assist ECU 4.

When the parking assist ECU 4 judges that the vehicle is in a process of parking the vehicle, the parking assist ECU 4 proceeds to a process of a step 160. When the parking assist ECU 4 judges that the vehicle is not in a process of parking the vehicle, the parking assist ECU 4 proceeds to end.

In the step 160, the parking assist ECU 4 supplies electricity to the speaker 18 and the light 16. After that, the parking assist ECU 4 proceeds to a process of a step 170. When electricity is supplied to the speaker 18 and the light 16, the speaker 18 makes sounds (for acoustically guiding that the vehicle can be parked at the target position for parking the vehicle), and the light 16 is turned on. Accordingly, the parking assist ECU 4 can calculate the course for parking the vehicle, and a user can be informed that the vehicle can be parked at the target position for parking the vehicle.

In the step 170, the parking assist ECU 4 judges whether the parking assist ECU 4 has received an on-signal from the reverse shift switch 20. When the parking assist ECU 4 judges that the parking assist ECU 4 has received the on-signal from the reverse shift switch 20, the parking assist ECU 4 displays a picture image taken by the monitor camera 12 on the display monitor 10. Further, the parking assist ECU 4 transmits a signal to the display monitor 10 for displaying layers of the frame for indicating the target position for parking the vehicle and the touch switch for setting the target position for parking the vehicle over the taken picture image. After that, the parking assist ECU 4 proceeds to a process of a step 180. On the other hand, when the parking assist ECU 4 judges that the parking assist ECU 4 has not received the on-signal from the reverse shift switch 20, the parking assist ECU 4 keeps on waiting until the parking assist ECU 4 receives the on-signal from the reverse shift switch 20.

In the step 180, the parking assist ECU 4 judges whether or not items of information regarding the target position for parking the vehicle has been fed from the touch switch for setting the target position, and judges whether or not the target position for parking the vehicle has been adjusted by a user. When the parking assist ECU 4 judges that items of information regarding the target position for parking the vehicle has been fed, the parking assist ECU 4 goes back to the process of the step 130, and the parking assist ECU 4 calculates the course for parking the vehicle once again on the basis of the target position and the current vehicle position. On the other hand, when the parking assist ECU 4 judges that items of information regarding the target position has not been fed, the parking assist ECU 4 proceeds to a process of a step 190.

In the step 190, the parking assist ECU 4 controls the automatic steering means 22, the automatic braking means 24 and the automatic driving means 26 so that the vehicle proceeds along the calculated course for parking the vehicle. Specifically, when a user reduces the level of depressing a brake pedal, the vehicle starts to move backward by creeping force. When the vehicle starts to move backward, the parking assist ECU 4 automatically turns the wheel by extent of a target steering angle by means of the automatic steering means 22 at each vehicle position within the course to the target position for parking the vehicle. Then, when the vehicle finally reaches the target position for parking the vehicle, the parking assist ECU 4 requests a user to stop the vehicle (or the parking assist ECU 4 automatically stops the vehicle by means of the automatic braking means 24). Thus, the parking assist control is completed.

A Second Embodiment

A second embodiment will be explained with reference to drawing figures.

Figure 4:
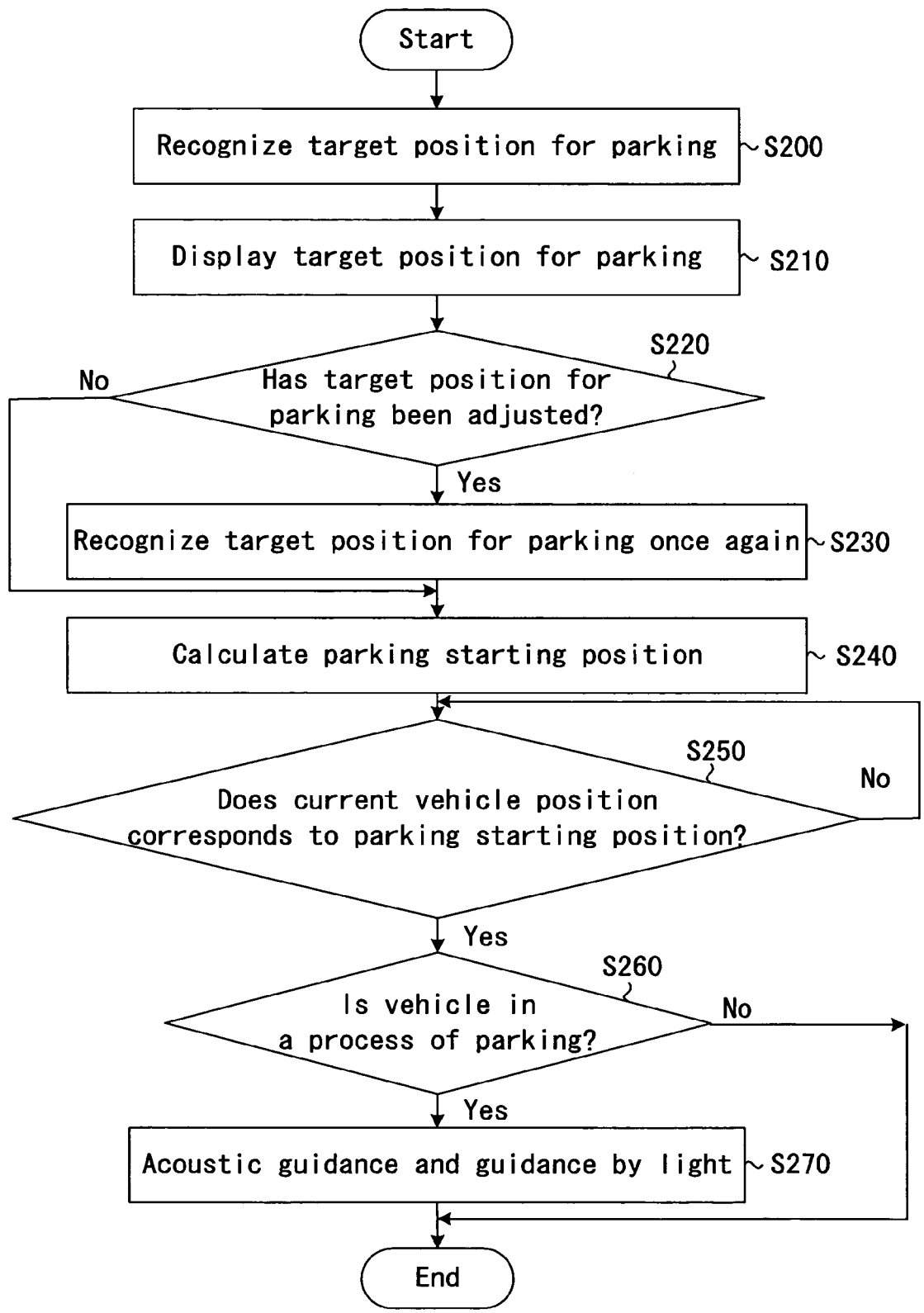
FIG. 4 represents a flow chart illustrating specific processes performed by a parking assist ECU of a parking assist apparatus according to a second embodiment of the present invention.

FIG. 4 represents a flow chart illustrating specific processes performed by a parking assist ECU 4 of a parking assist apparatus for a vehicle according to a second embodiment of the present invention.

In a step 200, when the parking assist ECU 4 judges that the vehicle is at a stop on the basis of a vehicle speed detected by the vehicle speed sensor 8, the parking assist ECU 4 recognizes a predetermined relative position to a current vehicle position as a target position for parking the vehicle. For example, when the parking assist ECU 4 judges that the vehicle temporally stops at a position, where approximately the center of the vehicle, more specifically, a seat position of the driver in the vehicle, corresponds to an extension of a line drawn in vertical direction from the center of the target position for parking the vehicle, the parking assist ECU 4 recognizes a predetermined relative position to a stopping position of the vehicle as the target position for parking the vehicle.

When the parking assist ECU 4 recognizes the target position for parking the vehicle, the parking assist ECU 4 proceeds to a process of a step 210.

In the step 210, the parking assist ECU 4 displays a picture taken from the monitor camera 12 on the display monitor 10. Further, the parking assist ECU 4 displays the recognized target position over the taken picture, and proceeds to a process of a step 220.

In the step 220, the parking assist ECU 4 judges whether or not items of information regarding the target position for parking the vehicle have been fed from the touch switch for setting the target position, and judges whether or not the target position has been adjusted by a user. When the parking assist ECU 4 judges that items of information regarding the target position have been fed, the parking assist ECU 4 recognizes once again the fed target position for parking the vehicle as the target position (step 230). On the other hand, when the parking assist ECU 4 judges that items of information have not been fed, the parking assist ECU 4 proceeds to a process of a step 240.

In the step 240, the parking assist ECU 4 calculates a parking starting position of the vehicle from which the vehicle can be parked at the target position for parking the vehicle on the basis of the recognized target position and the vehicle position where the target position has been recognized, and proceeds to a process of a step 250. Here, the parking starting position refers to a position where the vehicle starts moving backward toward the target position for parking the vehicle.

In the step 250, the parking assist ECU 4 judges whether or not the current vehicle position corresponds to the calculated parking starting position of the vehicle. When the parking assist ECU 4 judges that the current vehicle position corresponds to the calculated parking starting position of the vehicle, the parking assist ECU 4 proceeds to a process of a step 260. When the parking assist ECU 4 judges that the current vehicle position does not correspond to the calculated parking starting position of the vehicle, the parking assist ECU 4 waits at the step 250 until the current vehicle position corresponds to the calculated parking starting position of the vehicle.

In the step 260, the parking assist ECU 4 judges whether or not the vehicle is in a process of parking the vehicle. Specifically, the parking assist ECU 4 judges whether or not the vehicle is in a process of parking the vehicle on the basis of a moving condition of the vehicle after the target position for parking the vehicle described above was recognized. When the parking assist ECU 4 judges that the vehicle is in a process of parking the vehicle, the parking assist ECU 4 proceeds to a process of a step 270. When the parking assist ECU 4 judges that the vehicle is not in a process of parking the vehicle, the parking assist ECU 4 proceeds to end.

In the step 270, the parking assist ECU 4 supplies electricity to the speaker 18 and the light 16. The speaker 18 makes sounds (for acoustically guiding that the vehicle is at a parking starting position from which the vehicle can be parked at the target position for parking the vehicle), and the light 16 is turned on.

Third Embodiment

A third embodiment of the present invention will be explained with reference to drawing figures.

Figure 5:
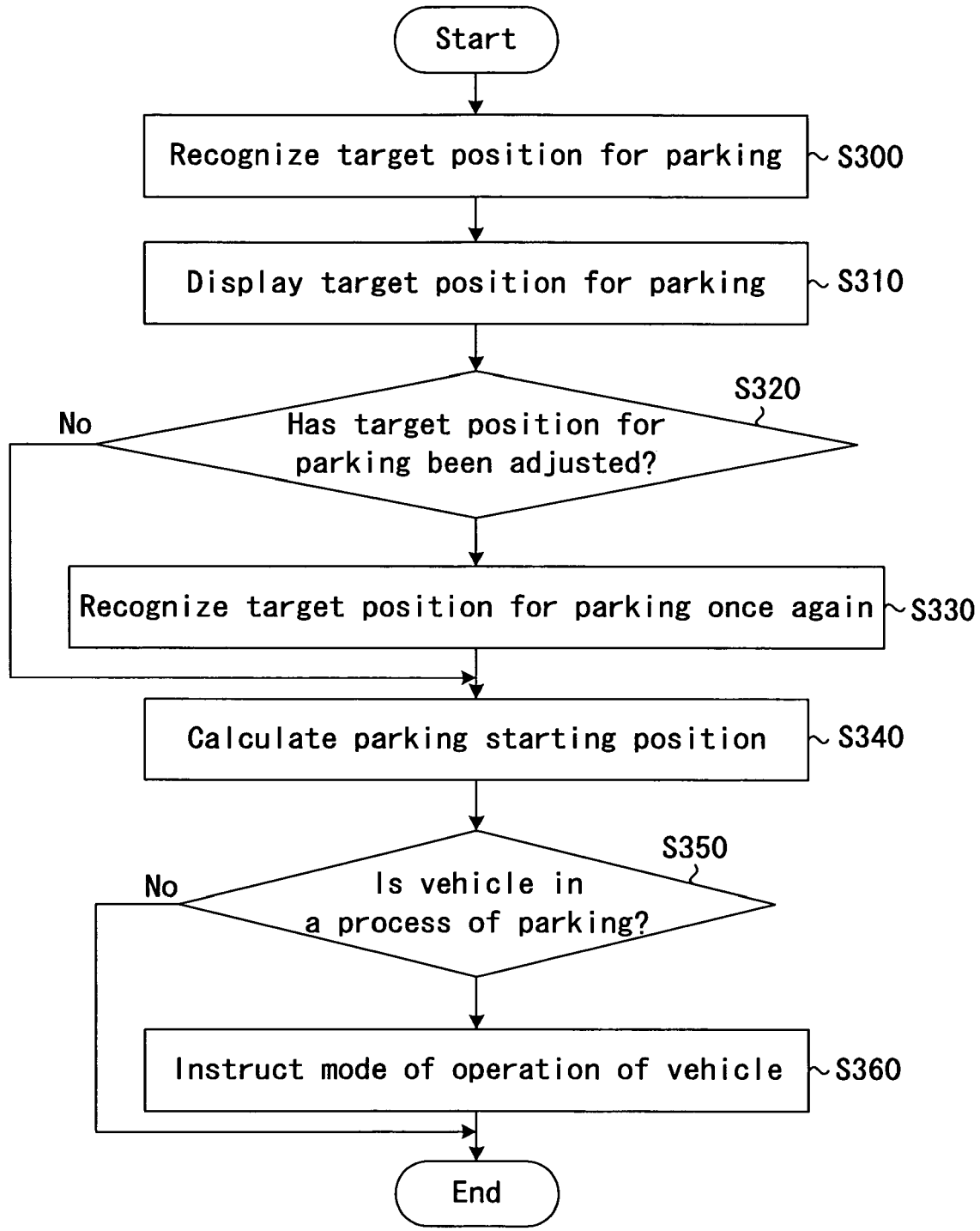
FIG. 5 represents a flow chart illustrating specific processes performed by a parking assist ECU of a parking assist apparatus according to a third embodiment of the present invention.

FIG. 5 represents a flow chart illustrating specific processes performed by a parking assist ECU 4 of a parking assist system.

In a step 300, when the parking assist ECU 4 judges that the vehicle is at a stop on the basis of a vehicle speed detected by a vehicle speed sensor 8, the parking assist ECU 4 recognizes a predetermined relative position to a current vehicle position as a target position of parking the vehicle. For example, when the parking assist ECU 4 judges that the vehicle temporally stops at a position, where approximately the center of the vehicle, more specifically, a seat position of the driver in the vehicle, corresponds to an extension of a line drawn in vertical direction from the center of the target position for parking the vehicle, the parking assist ECU 4 recognizes a relative predetermined position to a stopping position of the vehicle as the target position for parking the vehicle. After the parking assist ECU 4 recognizes the target position, the parking assist ECU 4 proceeds to a process of a step 310.

In the step 310, the parking assist ECU 4 displays a picture image taken from a monitor camera 12 on a display monitor 10. Further, the parking assist ECU 4 displays the recognized target position for parking the vehicle over the taken picture image, and proceeds to a process of a step 320.

In the step 320, the parking assist ECU 4 judges whether or not items of information regarding the target position have been fed from a touch switch for setting the target position on the display monitor 10, and judges that whether or not the target position has been adjusted by a user. When the parking assist ECU 4 judges that the items of information regarding the target position have been fed, the ECU 4 recognizes once again the fed target position as the target position (step 330). On the other hand, when the parking assist ECU 4 judges that the items of information have not been fed, the parking assist ECU 4 proceeds to a process of a step 340.

In the step 340, the parking assist ECU 4 calculates a parking starting position of the vehicle from which the vehicle can be parked at the target position on the basis of the recognized target position and a vehicle position where the target position was recognized, and proceeds to a process of a step 350.

In the step 350, the parking assist ECU 4 judges whether or not the vehicle is in a process of parking the vehicle. Specifically, the parking assist ECU 4 judges whether or not the vehicle is in a process of parking the vehicle on the basis of a moving condition of the vehicle after the target position described above was recognized. When the parking assist ECU 4 judges that the vehicle is in a process of parking, the parking assist ECU 4 proceeds to a process of a step 360. When the parking assist ECU 4 judges that the vehicle is not in a process of parking the vehicle, the parking assist ECU 4 proceeds to end.

In the step 360, the parking assist ECU 4 instructs a mode of operation of the vehicle to the parking starting position of the vehicle. Specifically, the parking assist ECU 4 calculates an optimum steering angle and a vehicle speed for moving the vehicle toward the parking starting position, and displays the calculated optimum steering angle and vehicle speed on the display monitor 10. In addition, the parking assist ECU 4 can displays layers of the picture taken from the monitor camera 12, the calculated parking starting position of the vehicle, and a course along which the vehicle should be moved on the display monitor 10. The parking assist ECU 4 can acoustically instruct, by means of a speaker 18, the optimum steering angle, vehicle speed, and direction. Further, the parking assist ECU 4 can control an automatic steering means 22, an automatic braking means 24, and an automatic driving means 26 for automatically moving the vehicle to the parking starting position of the vehicle.

Preferred embodiments of the present invention are described as above. However, the present invention is not limited to the embodiments described above. Various kinds of changes and replacements can be applied to the embodiments described above without deviating from a scope of the present invention.

In addition, in the embodiment described above, the parking assist ECU 4 corresponds to a calculating means, a recognizing means, a calculating means for calculating a parking starting position, an assistance means, and a judging means.

According to an aspect of the present invention, a parking assist apparatus for a vehicle includes a recognizing means for recognizing a target position for parking the vehicle, a calculating means for calculating a course for parking the vehicle from a current vehicle position to the target position recognized by the recognizing means during the vehicle being moving, and an informing means for informing a user of the vehicle that the vehicle can be parked at the recognized target position when the course for parking the vehicle has been correctly calculated by the calculating means.

According to the aspect of the present invention, the informing means informs a user that the vehicle is permitted to be parked at the target position for parking the vehicle when the course for parking the vehicle has been calculated. Accordingly, the target position of parking the vehicle need not be changed, or the vehicle need not to be moved from the parking starting position of the vehicle when the vehicle is at the parking starting position of the vehicle, which enables the vehicle to park in a shorter time, and thus increases a level of convenience for a user. In addition, the calculating means may calculate the course for parking the vehicle from the current vehicle position to the target position for parking the vehicle recognized by the recognizing means while the vehicle is at a stop.

According to a further aspect of the present invention, a parking assist apparatus for a vehicle includes a vehicle speed-detecting means for detecting a vehicle speed, a steering angle-detecting means for detecting a steering angle of the vehicle, a recognizing means for recognizing a target position for parking the vehicle, a calculating means for calculating a current vehicle position on the basis of information collected from the vehicle speed-detecting means and the steering angle-detecting means, and calculating a course for parking the vehicle on the basis of the calculated current vehicle position and the target position recognized by the recognizing means, during the vehicle being moving, and an informing means for informing a user of the vehicle that the vehicle is permitted to be parked at the recognized target position when the course for parking the vehicle has been calculated by the calculating means.

According to the aspect of the present invention, the target position for parking the vehicle need not to be changed, or the vehicle need not to be moved from the parking starting position of the vehicle when the vehicle is at the parking starting position of the vehicle, which enables the vehicle to park in a shorter time, and thus increases a level of convenience for a user. In addition, the calculating means may calculate the course for parking the vehicle on the basis of the current vehicle position and the target position for parking the vehicle recognized by the recognizing means while the vehicle is at a stop.

According to a further aspect of the present invention, it is preferable that the calculating, means subsequently calculate a course for parking the vehicle by every predetermined distance from a position of the vehicle where the target position of the vehicle has been recognized by the recognizing means.

According to a further aspect of the present invention, a parking assist apparatus for a vehicle includes a recognizing means for recognizing a target position for parking the vehicle, a calculating means for calculating a parking starting position suitable for parking the vehicle at the target position for parking the vehicle recognized by the recognizing means, and an assistance means for guiding the vehicle to the parking starting position. In addition, the parking starting position of the vehicle is not limited to a single point, but can be a certain area.

According to the aspect of the present invention, a user can firmly move the vehicle to the parking starting position of the vehicle from which the vehicle can be parked at the target position for parking the vehicle. Accordingly, the target position for parking the vehicle need not be changed, or the vehicle need not to be moved from the parking starting position of the vehicle when the vehicle is at the parking starting position of the vehicle, which enables the vehicle to be parked in a shorter time, and thus increases a level of convenience for a user.

According to a further aspect of the present invention, it is preferable that the assistance means inform a user of the vehicle that a current vehicle position corresponds to the parking starting position for parking the vehicle. Accordingly, the user can become to know the starting position for parking the vehicle from which the vehicle can be parked at the target position for parking the vehicle by the informing.

According to a further aspect of the present invention, it is preferable that the assistance means instruct a mode of operation to a user of the vehicle for moving the vehicle to the parking starting position. Accordingly, the user can move the vehicle to the parking starting position of the vehicle from which the vehicle can be parked at the target position for parking the vehicle by following the instructed mode of operation of the vehicle.

According to a further aspect of the present invention, it is preferable that the assistance means automatically guide the vehicle to the parking starting position for parking the vehicle. Accordingly, the user can firmly move the vehicle to the parking starting position of the vehicle from which the vehicle can be parked at the target position for parking the vehicle. In addition, burdens on a user for driving the vehicle can be reduced.

According to a further aspect of the present invention, it is preferable that the assistance means acoustically or visually inform a user of the vehicle of the parking starting position. Accordingly, the user can clearly recognize the parking starting position of the vehicle from which the vehicle can be parked at the target position for parking the vehicle.

According to a further aspect of the present invention, it is preferable that the recognizing means recognize a predetermined relative position to a vehicle position which is a vehicle stop position detected by the vehicle speed-detecting means as the target position for parking the vehicle.

According to a further aspect of the present invention, it is preferable that a parking assist apparatus for a vehicle further include a judging means for judging whether or not the informing means is allowed to inform the user of the vehicle that the vehicle can be parked at the recognized target position. The judging means permits the informing means to perform informing when the judging means judges that the vehicle is in a process of parking the vehicle. Accordingly, when the vehicle is not in a process of parking the vehicle, informing performed by the informing means can be prevented.

According to a further aspect of the present invention, it is preferable that the judging means perform judging on the basis of a moving condition of the vehicle after the target position for parking the vehicle is recognized by the recognizing means.

According to a further aspect of the present invention, it is preferable that the judging means perform judging on the basis of a map data of a navigation system.

According to a further aspect of the present invention, it is preferable that the judging means perform judging on the basis of a signal fed from a switch for setting whether or not to permit informing operable by the user of the vehicle.

In addition, the switch can be a switch which enables a user, corresponding to a preference of a user, to select from on/off conditions of the informing function of the informing means. Alternatively, the switch can be a switch which is operated, during a condition of stop of the vehicle, for making the recognizing means to recognize the target position for parking the vehicle.

According to a further aspect of the present invention, it is preferable that a parking assist system further include a display means for displaying a taken picture image of vehicle surroundings. The target position for parking the vehicle recognized by the recognizing means is displayed over the taken picture image. Accordingly, the user can check in advance whether or not the target position for parking the vehicle recognized by the parking assist apparatus corresponds to a target position for parking the vehicle intended by the user.

According to a further aspect of the present invention, it is preferable that the target position for parking the vehicle recognized by the recognizing means be displayed over the taken picture image when the course for parking the vehicle is correctly calculated by the calculating means.

According to a further aspect of the present invention, it is preferable that the target position for parking the vehicle recognized by the recognizing means displayed over the taken picture image be changeable on the display means by an operation of the user of the vehicle.

According to a further aspect of the present invention, it is preferable that the parking assist apparatus further include a judging means for judging whether or not to permit the assistance means to perform assisting. The judging means permits the assistance means to perform assisting when the judging means judges that the vehicle is in a process of parking the vehicle.

According to a further aspect of the present invention, a vehicle can be parked at a target position for parking the vehicle in a shorter time, which increases a level of convenience for a user.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking assist apparatus for a vehicle, comprising;
    a vehicle speed-detecting means for detecting a vehicle speed;
    a steering angle-detecting means for detecting a steering angle of the vehicle;
    a recognizing means for recognizing a target position for parking the vehicle;
    a calculating means for calculating different current vehicle positions on the basis of information collected from the vehicle speed-detecting means and the steering angle-detecting means, and successively and repeatedly calculating a correct course for parking the vehicle from the different current vehicle positions to the target position on the basis of the calculated different current vehicle positions and the target position recognized by the recognizing means, during a forward movement of the vehicle;
    a determining means for determining whether or not the correct course for parking the vehicle from one of the current vehicle positions to the target position has been calculated by the calculating means, and
    an informing means for informing a user of the vehicle that the vehicle is permitted to be parked at the recognized target position when the determining means determines that the correct course for parking the vehicle from the one of the current vehicle positions to the target position has been calculated.

2. The parking assist apparatus for a vehicle according to claim 1, wherein
    the calculating means subsequently and repeatedly calculates the correct course for parking the vehicle by every predetermined distance from a position of the vehicle where the target position of the vehicle has been recognized by the recognizing means.

3. The parking assist apparatus for a vehicle according to claim 1, wherein
    the recognizing means recognizes a predetermined relative position to a vehicle position which is a vehicle stop position detected by the vehicle speed-detecting means as the target position for parking the vehicle.

4. The parking assist apparatus for a vehicle according to claim 1, further comprising:
    a judging means for judging whether or not the informing means is allowed to inform the user of the vehicle that the vehicle can be parked at the recognized target position, wherein the judging means permits the informing means to perform informing when the judging means judges that the vehicle is in a process of parking the vehicle.

5. The parking assist apparatus for a vehicle according to claim 4, wherein
    the judging means performs judging when the steering angle detected by the steering angle sensor is a predetermined value or more, when the vehicle speed detected by the vehicle speed sensor is a predetermined value or less, and when the one of the current vehicle positions is within a predetermined distance from the target recognized position after the target position for parking the vehicle is recognized by the recognizing means.

6. The parking assist apparatus for a vehicle according to claim 4, wherein
    the judging means judges on the basis of a signal fed from a switch for setting whether or not to permit informing operable by the user of the vehicle.

7. The parking assist apparatus for a vehicle according to claim 1, further comprising:
    a display means for displaying a taken picture image of vehicle surroundings, wherein
    the target position for parking the vehicle recognized by the recognizing means is displayed over the taken picture image.

8. The parking assist apparatus for a vehicle according to claim 7, wherein
    the target position for parking the vehicle recognized by the recognizing means is displayed over the taken picture image when the correct course for parking the vehicle is calculated by the calculating means.

9. The parking assist apparatus for a vehicle according to claim 7, wherein
    the target position for parking the vehicle recognized by the recognizing means displayed over the taken picture image is changeable on the display means by an operation of the user of the vehicle.

* * * * *